(12) United States Patent
Wong et al.

(10) Patent No.: US 7,072,326 B2
(45) Date of Patent: Jul. 4, 2006

(54) NETWORK CONNECTIVITY SYSTEM AND METHOD

(75) Inventors: Yoon Kean Wong, Redwood City, CA (US); David Kammer, Seattle, WA (US); Steven C. Lemke, Sunnyvale, CA (US)

(73) Assignee: Palm, Inc., Santa Clara, CA (US)

( * ) Notice: Subject to any disclaimer, the term of this patent is extended or adjusted under 35 U.S.C. 154(b) by 903 days.

(21) Appl. No.: 09/998,108

(22) Filed: Nov. 30, 2001

(65) Prior Publication Data

US 2003/0103464 A1 Jun. 5, 2003

(51) Int. Cl.
*H04J 1/00* (2006.01)
*H04B 7/00* (2006.01)

(52) U.S. Cl. .................. 370/343; 370/254; 455/41.2; 455/418

(58) Field of Classification Search .............. 455/88, 455/92, 419, 420, 551, 41.2, 41.3, 418; 370/254, 370/277, 278, 282, 310, 343
See application file for complete search history.

(56) References Cited

U.S. PATENT DOCUMENTS

| | | | |
|---|---|---|---|
| 5,526,489 A | 6/1996 | Nilakantan et al. | |
| 5,802,286 A | 9/1998 | Dere et al. | |
| 5,974,312 A | * 10/1999 | Hayes et al. | ............... 455/419 |
| 6,141,690 A | 10/2000 | Weiman | |
| 6,252,884 B1 | 6/2001 | Hunter | |
| 6,301,477 B1 | 10/2001 | Lennert et al. | |
| 6,324,654 B1 | 11/2001 | Wahl et al. | |
| 6,687,496 B1 * | 2/2004 | Nangle | ....................... 455/419 |
| 6,842,613 B1 * | 1/2005 | Mittal | ....................... 455/419 |
| 6,876,295 B1 * | 4/2005 | Lewis | .................... 340/10.34 |

* cited by examiner

*Primary Examiner*—Chi Pham
*Assistant Examiner*—Tito Pham

(74) *Attorney, Agent, or Firm*—Foley & Lardner LLP

(57) ABSTRACT

A method of configuring an electronic device for communications with a communications network includes establishing a wireless communications link between a first electronic device and a second electronic device. The first electronic device has saved thereon a set of network parameters for enabling communications between the first electronic device and the communications network. The method also includes communicating the set of network parameters to the second electronic device, retaining the set of network parameters on the second electronic device, and establishing a communications link between the second electronic device and the communications network by applying settings to the second electronic device. The settings are based on the network parameters.

20 Claims, 3 Drawing Sheets

NETWORK CONNECTIVITY SYSTEM AND METHOD

BACKGROUND

The present invention relates to systems and methods for connecting wireless electronic devices to communication networks. In particular, the invention relates to systems and methods used for connecting wireless electronic devices to communications networks using settings from an intermediary device already connected to the network.

As wireless network technologies are becoming increasingly important, especially in wireless local area networks (WLANs), it is also becoming increasingly important that electronic devices have methods which automatically configure the devices for communicating with the communications network.

Conventionally, when an electronic device needs to "talk" (connect) to a communications network, a number of setting adjustments may need to be made before the connection may be established and the communication may begin. For example, the type of communications scheme may need to be set, is it a serial communications (8- or 16-bit), a parallel communications channel, etc. Further, the type of communications protocol being used must be set appropriately. For example, a handheld computer device having an IEEE 802.11 transceiver and attempting to communicate with a fixed communications network through an access point may need to have settings configured to communicate with the access point. If, however, it is the first time that the handheld computer has encountered the access point, proper settings may need to be established to communicate with the access point. In conventional methods, a user may need to manually configure the device for communicating with the access point, or the user may need to download information prior to the encounter with the access point to adjust such settings.

Accordingly, there is a need for a system and method for establishing communications with the communications network by providing access to communications settings for a portable electronic device. Further, there is need for a system and method of using an intermediary electronic device for providing setting adjustments to a device which permits communication with a communications network.

It would be desirable to provide a system and/or method that provides one or more of these or other advantageous features. Other features and advantage will be made apparent from the present specification. The teachings disclosed extend to those embodiments which fall within the scope of the appended claims, regardless of whether they accomplish one or more of the above-mentioned needs.

SUMMARY

An exemplary embodiment of the invention relates to a method of configuring an electronic device for communications with a communications network. The method includes establishing a wireless communications link between a first electronic device and a second electronic device. The first electronic device has saved thereon a set of network parameters for enabling communications between the first electronic device and the communications network. The method also includes communicating the set of network parameters to the second electronic device. Further, the method includes retaining the set of network parameters on the second electronic device. Further still, the method includes establishing a communications link between the second electronic device and the communications network by applying settings to the second electronic device, the settings based on the network parameters.

Another exemplary embodiment of the invention relates to a communications system. The communications system includes a communications network including at least one wireless access point. The communications system also includes a first electronic device having network parameters enabling communications between the first electronic device and the communication network. The first electronic device includes a first wireless transceiver. The communications system further includes a second electronic device having a first set of logic running thereon and a second wireless transceiver. The first set of logic includes functionality to communicate with the first electronic device between the first and second wireless transceivers and the first set of logic includes functionality to receive the network parameters from the first electronic device. Further still, the communications system includes a second set of logic, providing settings on the second electronic device based on the network parameters and establishing communications between the second electronic device and the network.

Still another exemplary embodiment of the invention relates to a handheld computer. The handheld computer includes a processor, a memory coupled to the processor, a transceiver coupled to the processor, and at least one program stored in the memory and running on the processor, the program includes logic to receive settings from an intermediary device via the transceiver. The settings are used for the intermediary device to connect to a communications network, and the at least one program includes logic to connect to the communications network by using the settings.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
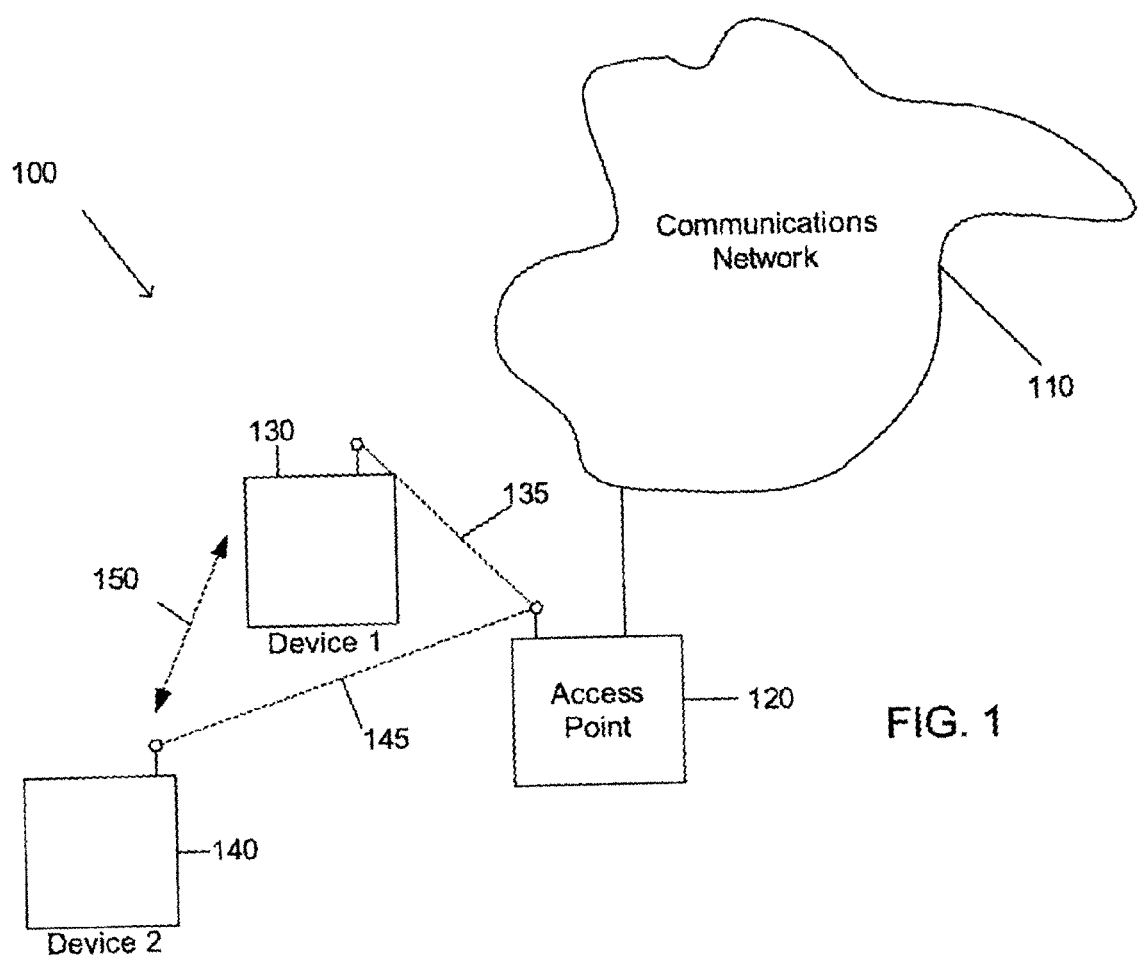
FIG. 1 is a block diagram of a communications network including a wireless access point with which portable electronic devices communicate.

Referring to FIG. 1, a communications system 100 is depicted. Communications system 100 includes a communications network 110 which may be any of a variety of communications networks including, but not limited to, local area networks (LANs), intranets, extranets, the internet, etc. In an exemplary embodiment, communications network 110 includes a wireless access point 120 for communicating with wireless and/or portable devices. Access point 120 may be provided to allow access using any of a variety of hardware and software protocols including, but not limited to, IEEE 802.11 shared wireless access protocol (SWAP), Bluetooth, etc. Further, in an exemplary embodiment a portable electronic device 130 includes a wireless transceiver for connecting to access point 120 via a wireless link 135.

Initially, device 130 includes a plurality of hardware and/or software settings to enable communications with access point 120. Settings for device 130 may have been set manually, or may have been set automatically via a plurality of methods, including the method of this invention. However, in the exemplary arrangement depicted in FIG. 1, device 130 acts as an intermediary device that is used to set up a second portable electronic device 140 for communicating with access point 120 over a wireless link 145.

In an exemplary embodiment, device 140 encounters access point 120; however, device 140 has no knowledge of how to communicate with access point 120 i.e., device 120 is unaware of what communications settings to use. Device 140, however, does know how to communicate with device 130, for any of a variety of reasons including device 130 is a recognized device to device 140, device 130 and 140 are utilizing self-configuring wireless devices such as, but not limited to, Bluetooth devices, which enable automated communications to be established between device 130 and device 140, and/or device 130 and device 140 are similar devices having identical hardware and software, only differing in, for example, their mobile identification or address. In such a case, device 140 has a program running thereon to receive settings for enabling communications with access point 120. The program running on device 140 receives information, including device settings from device 130 over a communications link 150. The information and settings received by device 140 are then used to configure device 140 to communicate with access point 120 over wireless link 145. Accordingly, by receiving configuration information directly from device 130, with which device 140 is able to communicate, device 140 is not required to be separately configured either manually or automatically to enable communications with access point 120.

Figure 2:
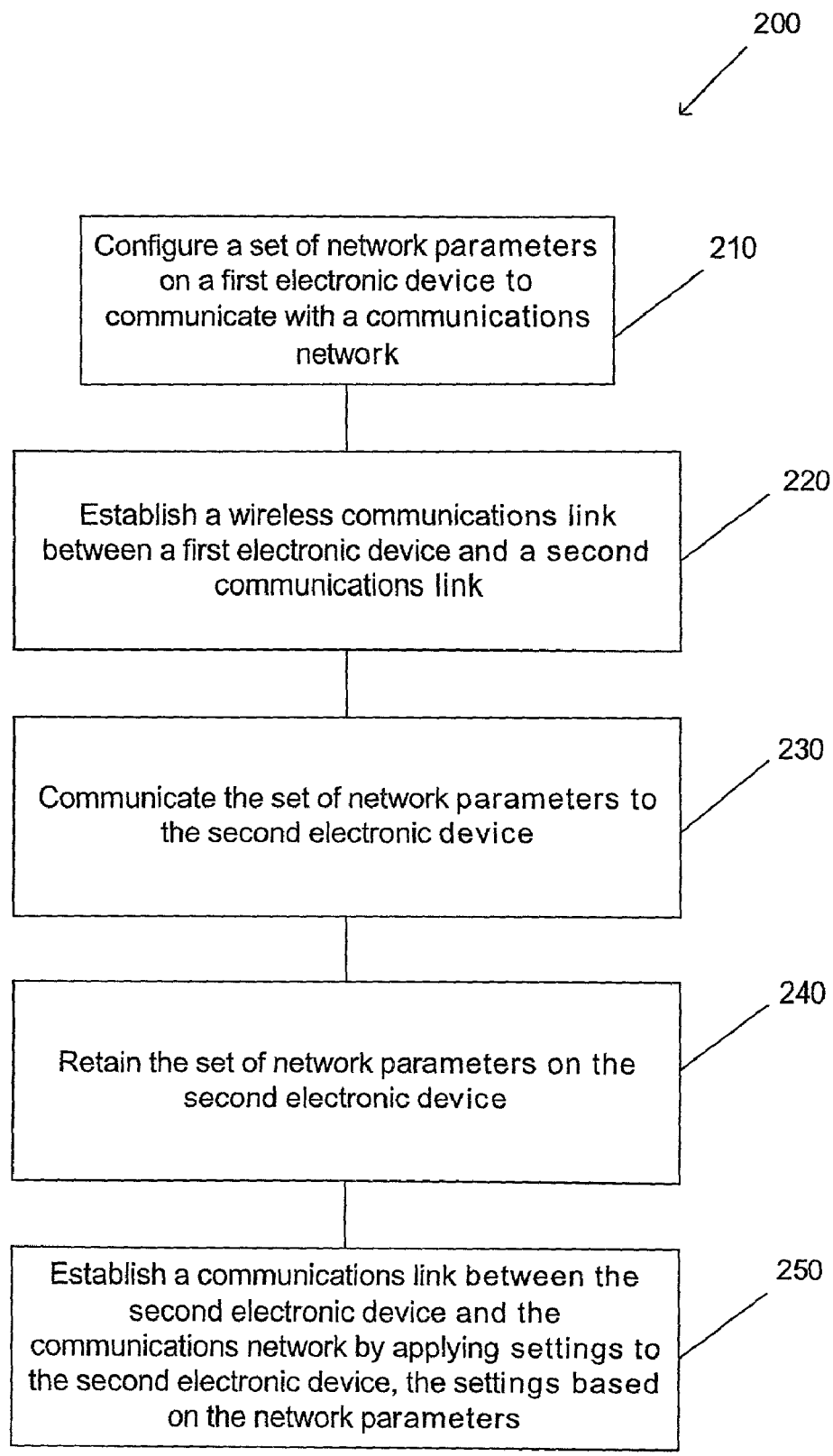
FIG. 2 is a process diagram depicting steps for establishing communications with a communications network.

Referring now to FIG. 2, an exemplary process 200 for establishing communications between a device, such as device 140, and an access point, such as access point 120, is depicted. A first set of network parameters are configured on a first electronic device, such as device 130, to enable communications with a communications network (step 210) (via an access point, such as access point 120). Once device 130 has appropriate network parameters configured thereon, device 130 may act as an intermediary device for devices which encounter or come in communication with device 130. As device 140 comes in communication with device 130, a wireless communications link may be established between device 130 and device 140 (step 220). In an alternative embodiment device, 130 and device 140 may have any of a variety of communications links including, but not limited to, wired links, radio frequency links, infrared links, ultrasonic links, etc. Once communication is established between device 130 and device 140, a set of network parameters is communicated to device 140 (step 230). Once the network parameters are received by device 140, the network parameters are retained on device 140 by storing the network parameters on a storage device (memory, disk, etc.) (step 240). Having retained the network parameters on device 140, device 140 may then be configured to establish a communications link between device 140 and access point 120 by applying the settings to device 140 appropriately, those settings being based on the network parameters received from device 130 (step 250).

Figure 3:
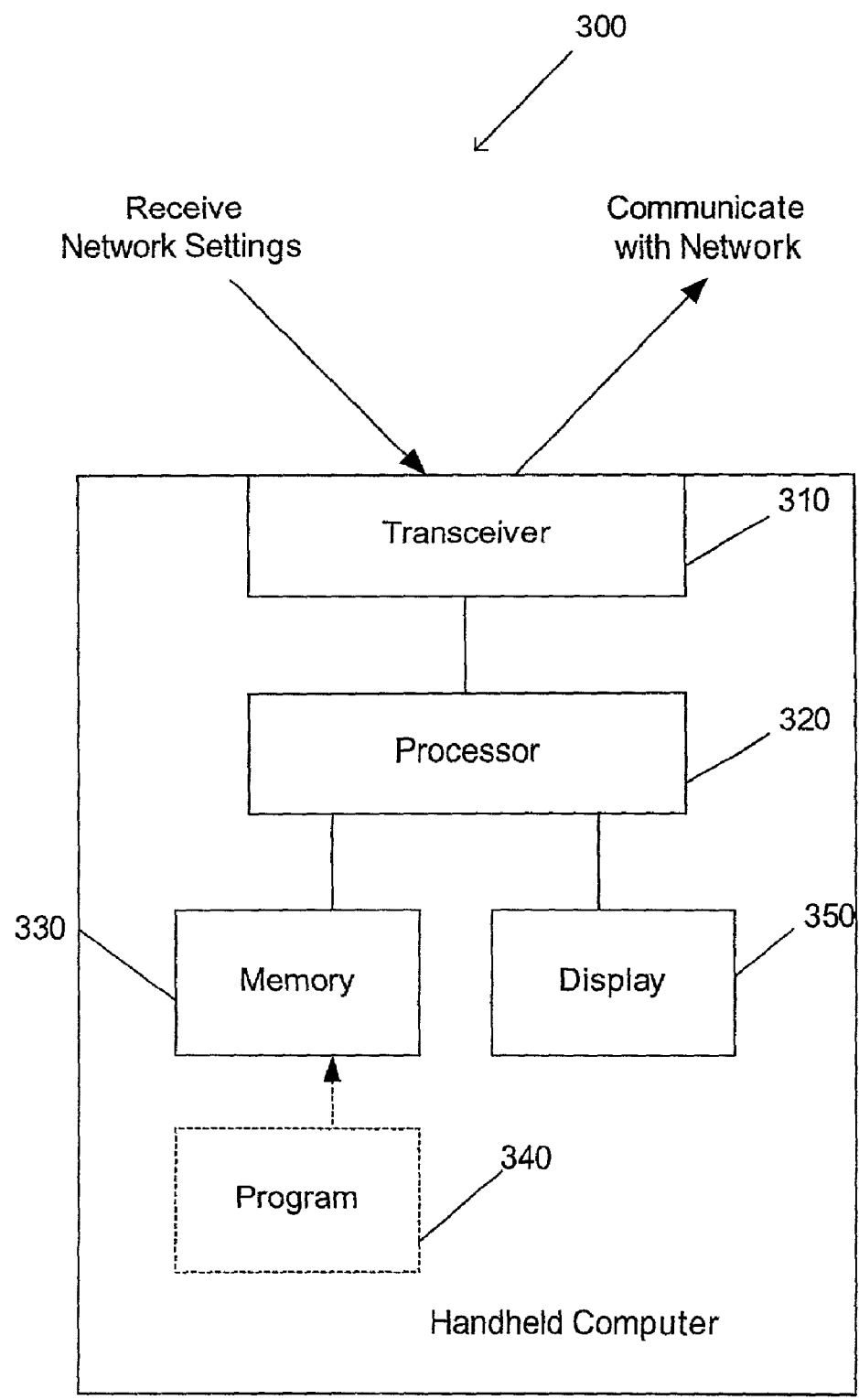
FIG. 3 is a block diagram of a handheld computer configured to receive network settings from an intermediary device and communicate with a network.

Referring now to FIG. 3, a handheld computer 300 is depicted. Handheld computer 300 is configured to receive network settings from an intermediary electronic device having a wireless network connection. Further, handheld computer 300 is also configured to communicate with communications network 110 once appropriately configured, based on the network settings received. Handheld computer 300 includes a transceiver 310, a processor 320 coupled to transceiver 310, a memory 330 coupled to processor 320, and a display 350 coupled to processor 320. In an exemplary embodiment, memory 330 includes, among other software, a program 340 that is configured to receive network settings from an intermediary device. Program 340 may further include logic steps which automatically configure hardware and software settings in handheld computer 300 to communicate with network access point 120.

In general, it may be primarily useful to use the invention discussed above and below with IEEE 802.11 access points which require that the device communicating with the access point be properly configured prior to encountering the access point. However, it may be contemplated that handheld computer 300, or other electronic device 140, which may communicate with a Bluetooth access point 120 via a Bluetooth receiver, require unique parameter settings to communicate properly with communications network 110 even though the Bluetooth specification or other communications protocol specifications may enable some self-configuring or automatic configuration of the portable device upon encountering access point 120. Thus, although such automatic or partially automatic configuration may be possible, the functionality of the claimed and disclosed invention may still be equally applicable and useful to such situations.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications networks, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of configuring an electronic device for communications with a communications network, comprising establishing a wireless communications link between a first electronic device and a second electronic device, the first electronic device having saved thereon a set of network parameters for enabling communications between the first electronic device and the communications network;

communicating the set of network parameters to the second electronic device;

retaining the set of network parameters on the second electronic device; and establishing a communications link between the second electronic device and the communications network by applying settings to the second electronic device, the settings based on the network parameters.

2. The method of claim 1, further comprising:
configuring a first electronic device to communicate with a communications network by saving a set of network parameters on the first electronic device.

3. The method of claim 1, wherein the wireless communications link is an infrared communications link.

4. The method of claim 1, wherein the wireless communications link is a radio frequency (RE) communications link.

5. The method of claim 1, further comprising:
establishing a communications link between the first electronic device and the communications network.

6. The method of claim 1, wherein the first electronic device is a handheld computer.

7. The method of claim 1, wherein the second electronic device is a handheld computer.

8. The method of claim 1, wherein the communications network includes at least one wireless access point.

9. The method of claim 8, wherein the wireless access point is a Bluetooth access point.

10. The method of claim 8, wherein the wireless access point is an IEEE 802.11 access point.

11. A communications system, comprising:
a communications network including at least one wireless access point;
a first electronic device having network parameters enabling communications between the first electronic device and the communication network, and the first electronic device including a first wireless transceiver;
a second electronic device having a first set of logic running thereon and a second wireless transceiver, the first set of logic including functionality to communicate with the first electronic device between the first and second wireless transceivers and the first set of logic including functionality to receive the network parameters from the first electronic device; and
a second set of logic, providing settings on the second electronic device based on the network parameters and establishing communications between the second electronic device and the network.

12. The communications system of claim 11, wherein the access point is a Bluetooth access point.

13. The communications system of claim 11, wherein the access point is an IEEE 802.11 access point.

14. The communications system of claim 11, wherein the first electronic device is a handheld computer.

15. The communications system of claim 11, wherein the second electronic device is a handheld computer.

16. A handheld computer, comprising:
a processor;
a memory coupled to the processor;
a transceiver coupled to the processor;
a at least one program stored in the memory and running on the processor, the program including logic to receive settings from an intermediary device via the transceiver, the settings being used for the intermediary device to connect to a communications network, and the at least one program including logic to connect to the communications network by using the settings.

17. The handheld computer of claim 16, wherein the transceiver is a Bluetooth transceiver.

18. The handheld computer of claim 16, wherein the transceiver is an IEEE 802.11 transceiver.

19. The handheld computer of claim 16, wherein the intermediary device is a handheld computer.

20. The handheld computer of claim 17, wherein the settings between the handheld computer and the intermediary handheld computer are communicated via an infrared link.

* * * * *